3,405,166
2-HEXAFLUOROISOPROPYL-2'-DICHLOROTETRA-
FLUOROISOPROPYL DIPHENATE
Jerome Hollander and Cyril Woolf, Morristown, N.J.,
assignors to Allied Chemical Corporation, New York,
N.Y., a corporation of New York
No Drawing. Filed Mar. 25, 1964, Ser. No. 354,755
1 Claim. (Cl. 260—475)

ABSTRACT OF THE DISCLOSURE

A compound having the formula:

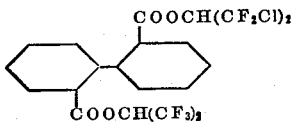

This invention relates to the compound, 2-hexafluoroisopropyl-2-dichlorotetrafluoroisopropyl diphenate, and its preparation.

In view of its thermal and oxidative stability, 2-hexafluoroisopropyl - 2'-dichlorotetrafluoroisopropyl diphenate is useful as a heat transfer fluid and as a high temperature lubricant.

An object of this invention is to provide a new and useful compound, 2-hexafluoroisopropyl-2'-dichlorotetrafluoroisopropyl diphenate. A further object is to provide a novel process for the preparation of this compound. Still, a further object is to provide a novel process for the preparation of hexafluoroisopropyl alcohol, which is useful as a surfactant as shown in the copending application of Jerome Hollander and Cyril Woolf, Ser. No. 207,382, filed July 3, 1962. Other objects and advantages will become apparent hereinafter.

In accordance with the invention, 2-hexafluoroisopropyl-2'-dichlorotetrafluoroisopropyl diphenate,

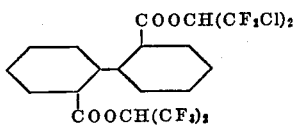

and hexafluoroisopropyl alcohol are produced by admixing 2,2'-bis(hexafluoroisopropyl) diphenate with dichlorotetrafluoroisopropyl alcohol in the presence of an esterification acid catalyst as illustrated by the following equation:

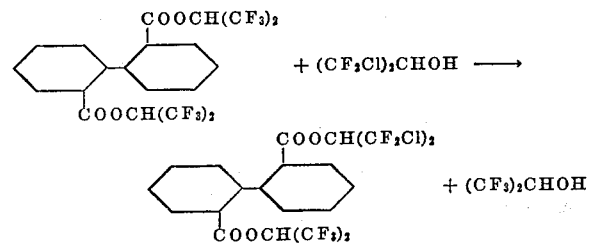

The process for the preparation of 2-hexafluoroisopropyl-2'-dichlorotetrafluoroisopropyl diphenate can be conducted by admixing the reactants with a small amount of sulfuric acid in a reaction vessel such as a glass-lined container optionally equipped with refluxing and heating means. The reactant, 2,2'-bis(hexafluoroisopropyl) diphenate, is prepared by the process shown in the copending application of Jerome Hollander and Cyril Woolf, Ser. No. 354,768, filed Mar. 25, 1964. The reactant, dichlorotetrafluoroisopropyl alcohol, is prepared by the process shown in the copending application of Joseph Gordon and Cyril Woolf, Ser. No. 142,784, filed Oct. 4, 1961, now U.S. Patent No. 3,189,656.

The molar ratio of the reactants can be varied over a broad range. 0.1 to 2 mols of 2,2'-bis(hexafluoroisopropyl) diphenate per mol of dichlorotetrafluoroisopropyl alcohol can be used, and preferably, about 0.3 to about 1.0 mol of diphenate per mol of alcohol is used.

The compound used as a catalyst in this reaction is sulfuric acid, which is preferably concentrated but can be 75% by weight. The amount of sulfuric acid which can be used is about 0.5 to 5 percent by weight, based on the weight of concentrated sulfuric acid and the total weight of the reactants. The preferred amount of sulfuric acid is about 0.75 to about 2 percent by weight. In place of sulfuric acid, trifluoroacetic acid, p-toluenesulfonic acid, or other esterification catalysts can be used in the same amounts. The acid-catalyzed esterification process shown in Fieser et al., Advanced Organic Chemistry, Reinhold Publ. Corp., 1961, pp. 370–381, broadly describes the subject process of transesterification.

The reaction can be conducted over a wide range of temperatures ranging from about 40° C. to about 200° C. The preferred temperature range is from about 60° C. to about 125° C. Practically, the reaction under reflux is conducted at the reflux temperature of the reaction mixture, the reflux temperature being about 130° C. The reaction time also covers a wide range from about 2 hours to about 48 hours, and, preferably, from about 10 to about 26 hours. Atmospheric pressure is preferable and most practical, but super-atmospheric and sub-atmospheric pressures can be used. The atmosphere surrounding the reactants is preferably air, but can be an inert gas.

The products, 2 - hexafluoroisopropyl-2'-dichlorotetrafluoroisopropyl diphenate and hexafluoroisopropyl alcohol, are conveniently separated by distillation, the hexafluoroisopropyl alcohol distilling over at its boiling point which is 57–58° C. The diphenate is the residue of the distillation.

In order to obtain the product, i.e., 2-hexafluoroisopropyl-2'-dichlorotetrafluoroisopropyl diphenate, having a high degree of purity, the residue of the distillation can be dissolved in ether or another volatile solvent such as tetrahydrofuran. The ether solution is then washed with a base such as 4% potassium hydroxide solution and with water. The solution can then be dried over anhydrous sodium sulfate or other drying agents such as magnesium sulfate. Removal of the ether or other solvents under reduced pressure yields a brown viscous oil. Distillation of this oil yields 2-hexafluoroisopropyl-2'-dichlorotetrafluoroisopropyl diphenate as a light yellow liquid with a boiling point 135–145° C. at 5 mm. On standing this light yellow liquid crystallizes to a yellow solid having a melting point of 45–47° C.

In the following examples parts and percentages are by weight:

EXAMPLE I 18.7 parts of 2,2'-bis(hexafluoroisopropyl) diphenate, 10.1 parts of dichlorotetrafluoroisopropyl alcohol, and 1 part of concentrated sulfuric acid were heated together at reflux in a Pyrex reaction vessel with a reflux condenser for 24 hours. Distillation at atmospheric pressure yielded 6 parts of hexafluoroisopropyl alcohol. The residue from the distillation was taken up in ether and the ether solution washed with three 80 part portions of 4% potassium hydroxide solution, then with three 80 part portions of water and then dried over anhydrous sodium sulfate. Removal of the ether under reduced pressure yielded 15.3 parts of a brown viscous oil. Distillation of the oil afforded 7 parts of 2-hexafluoroisopropyl-2'-dichlorotetrafluoroisopropyl diphenate as a light yellow liquid which crystallized to a yellow solid on standing overnight.

*Analysis* (in percent).—Calculated for $C_{20}H_{10}F_{10}Cl_2O_4$: H, 1.74; F, 33.0. Found: H, 1.81; F, 31.3.

EXAMPLE II

The product 2-hexafluoroisopropyl-2'-dichlorotetrafluoroisopropyl diphenate of Example 1 was tested for thermal stability in a Pyrex container at 300° C. for 24 hours under nitrogen. The product was recovered after cooling and identified as the product of Example 1, used initially.

We claim:
1. A compound having the formula:

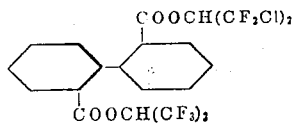

References Cited

Murphy et al.: Chem. Abstracts, vol. 54, pp. 9836i–9837a, 1960.

Migrdichian Organic Synthesis, Reinhold, New York, 1957, p. 328.

Ravner et al.: Jour. of Chem. and Eng. Data, vol. 8, No. 4, pp. 591–593, 1963.

LORRAINE A. WEINBERGER, *Primary Examiner.*

T. L. GALLOWAY, *Assistant Examiner.*